United States Patent [19]

van Beek et al.

[11] Patent Number: 4,861,318
[45] Date of Patent: Aug. 29, 1989

[54] CONTROL OF AN INFINITELY VARIABLE TRANSMISSION OF A VEHICLE

[75] Inventors: Coenraad H. van Beek, Diessen; Wilhelmus J. M. van Wijk, Tilburg, both of Netherlands

[73] Assignee: Van Doorne's Transmissie B.V., Tilburg, Netherlands

[21] Appl. No.: 168,717

[22] Filed: Mar. 16, 1988

[30] Foreign Application Priority Data

Mar. 17, 1987 [NL] Netherlands .......................... 8700626

[51] Int. Cl.[4] ............................................. F16H 11/02
[52] U.S. Cl. ........................................ 474/18; 74/868; 474/70
[58] Field of Search .................. 474/69, 70, 11, 12, 474/17–19, 28; 74/856, 857, 865, 867–869

[56] References Cited

U.S. PATENT DOCUMENTS 4,369,675 1/1983 Van Deursen .................. 474/18 X
4,671,140 6/1987 Koshio .............................. 474/18 X

FOREIGN PATENT DOCUMENTS 0011342 5/1980 European Pat. Off. .
0161085 11/1985 European Pat. Off. .
168038 2/1982 Netherlands .

Primary Examiner—Thuy M. Bui
Attorney, Agent, or Firm—Pennie & Edmonds

[57] ABSTRACT

A control device for controlling the transmission ratio of an infinitely variable transmission of a motor vehicle is disclosed. The transmission ratio is adjustably dependent on the position of a hydraulic control valve which is movable in dependence upon the difference between a predetermined desired engine speed and the actual engine speed. A stop member displaceable in dependence upon the transmission ratio regulates the minimum possible engine speed in dependence thereon.

11 Claims, 5 Drawing Sheets

CONTROL OF AN INFINITELY VARIABLE TRANSMISSION OF A VEHICLE

BACKGROUND OF THE INVENTION

1. Field of the Invention

The invention relates to a controlling device for the transmission ratio of an infinitely variable transmission of a motor vehicle, whereby the transmission ratio is adjustable dependent on the position of a hydraulic control valve, which is movable under the influence of the difference between a desired and an actual engine speed.

2. Description of the Prior Art

A controlling device of this kind is disclosed in the Dutch patent 168038. Here the infinitely variable transmission consists of a pair of cone-faced pulleys between which a V-belt is tensioned and whereby each of the pulleys is adjustable in order to make it possible to adjust the transmission ratio. With the known control the transmission ratio and the engine speed as well as the input speed are always regulated such that the engine speed is adapted to the power required. The engine speed is hereby set by means of an accelerator pedal (throttle) between two limits for the operating speed of the engine in question. However, abrupt changes in the transmission ratio occur when the minimum engine speed and the maximum engine speed are reached. A solution for the latter abrupt change is offered in the above-mentioned publication. A solution for the former abrupt change is offered by the present invention. This invention is characterized in that there are also means present for regulating the minimum possible engine speed in dependence of the transmission ratio.

SUMMARY OF THE INVENTION

As a result of the measure proposed it is achieved that the driving comfort is improved, because a jerky behaviour of the vehicle upon reaching the maximum, and especially the minimum engine speed is eliminated.

An advantageous embodiment of the controlling device according to the invention, whereby with respect to the desired engine speed the hydraulic control valve is loaded by a spring, which can be compressed under the influence of the engine speed, and with respect to the actual engine speed is influenced by a fluid pressure which is dependent on said engine speed, is characterized in that the means that regulate the minimum engine speed in dependence of the transmission ratio comprise a stop which is displaceable in dependence of the transmission ratio.

According to the invention a further improvement is attained in that the stop is shaped such that it allows a lower minimum engine speed with the maximum transmission ratio and a higher minimum engine speed with the minimum transmission ratio, and that upon approaching the maximum transmission ratio the minimum engine speed is regulated such that the transmission ratio changes substantially continuously into the maximum transmission ratio. Because of this it is achieved that both the vehicle speed and the engine speed gradually decrease upon approaching the maximum transmission ratio, so that sudden decelerations of the engine or the vehicle no longer occur and thus the driving comfort is further improved.

BRIEF DESCRIPTION OF THE DRAWINGS

In order to explain the invention more fully an embodiment will be described hereinafter with reference to the drawing, in which.

DETAILED DESCRIPTION OF THE PREFERRED EMBODIMENTS

Figure 1:
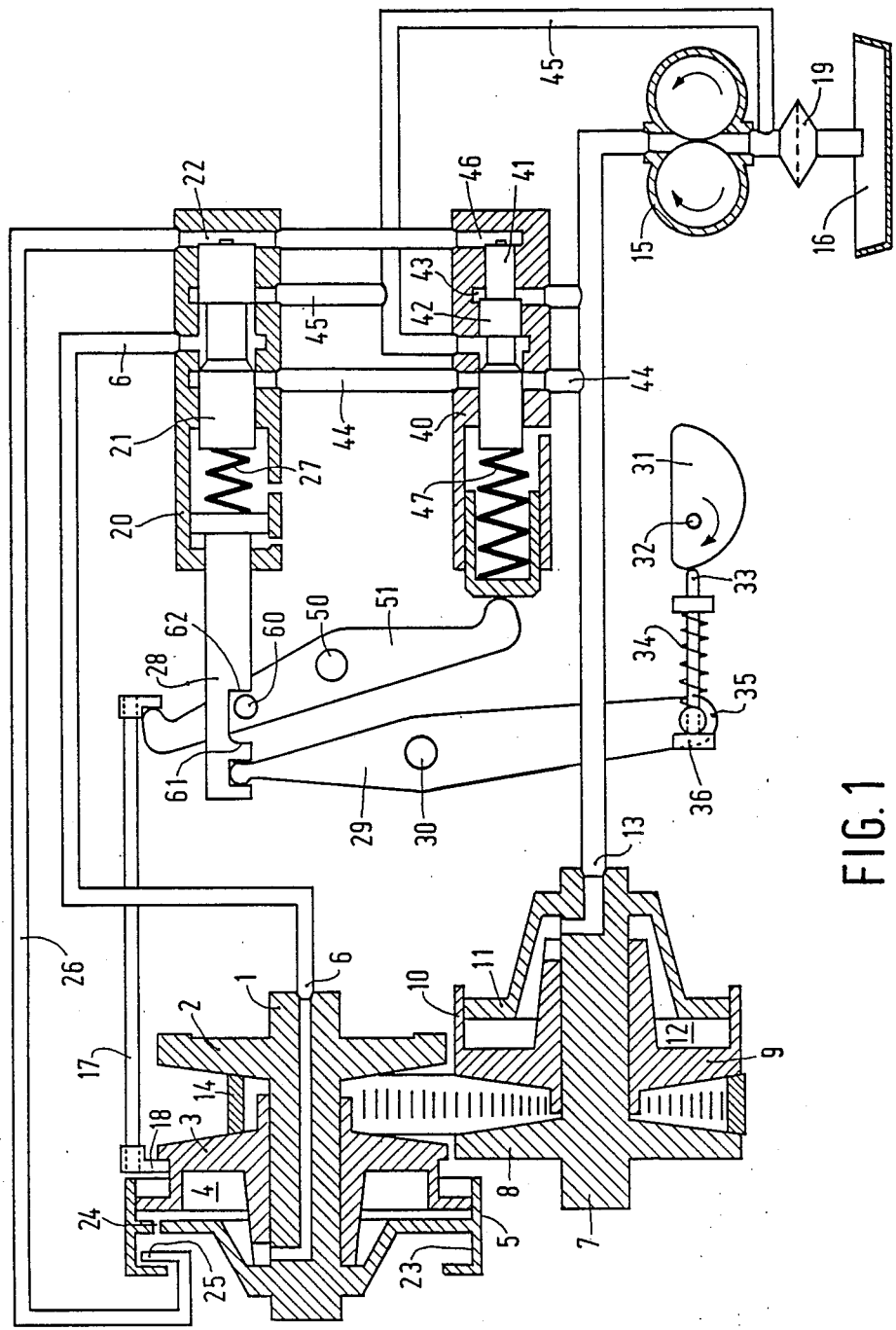
FIG. 1 is a diagrammatic illustration of the control used in an infinitely variable V-belt transmission, whereby two valves are present, which regulate the belt tension and the transmission ratio respectively.

In FIG. 1 reference number 1 indicates the ingoing shaft which is connected to the primary pulley, which is provided with a fixed pulley half and an axially movable cone-faced one (2, 3 respectively). The pulley half 3 is provided as a piston in the cylinder space 4 of a cylinder 5. Said pulley half can be moved axially by supplying and discharging a fluid via a pipe 6.

In a corresponding manner there is an outgoing shaft 7 present, which is driven by a secondary pulley consisting of two conical pulley halves 8 and 9. The pulley half 9 of said pulley is connected to a cylinder 10 in which the piston 11 is present, which piston is fixed to the shaft 7. Supplying and discharging a fluid via pipe 13 to the cylinder space 12 enclosed by the parts 10 and 11 will axially move the pulley half 9. Between the primary and the secondary pulleys there is provided a V-shaped, preferably metal driving belt 14. The difference in rotation rate for the shafts 1 and 7 can be regulated steplessly by axial movement of the pulley halves 3 and 9, as the running radii of the belt on the pulleys can be changed herewith. The fluid pressure required for the regulation is supplied by a pump 15, which pumps fluid from a reservoir 16 via a filter 19.

For signalling the transmission ratio there is provided a rod 17 which follows the movement of the pulley half by means of a sensor shoe 18. The rod 17 moves in its axial direction hereby.

For the regulation of the transmission ratio of the transmission there is a valve 20 present, in which there is an axially movable control slide 21 present. This latter slide is loaded at one end by a fluid pressure in the space 22. Said pressure is dependent on the speed of the ingoing shaft 1. For this purpose the cylinder 5 is provided with an annular channel 23 which is filled with fluid from the cylinder space 4 via opening 24. By means of the Pitot tube 25 the pressure in the channel 23 is transmitted to the space 22 via the pipe 26.

The other end of the control slide 21 is loaded by the spring 27 which is compressed by the operating means 28. Said means is axially movable by means of the lever 29, which can pivot about the fulcrum 30. Said pivotal motion is effected when the end 35 of the lever 29 is moved by a cam gear, a cam 31 of which is mechanically connected to the accelerator pedal or the throttle of the engine. When the position of the throttle is changed the cam 31 will pivot about the pivoting point 32 and the cam follower 33 is moved, as a result of which the end 35 retained between a spring 34 and a stop 36 effects a pivoting motion of the lever 29.

The rotation of the cam 31 about the pivoting point 32 may take place dependent on the position of the throttle or e.g. of the accelerator pedal. The cam may be mechanically connected to the throttle, whereby the shape of the cam 31 determines the relation between the position of the throttle and the movement of the means 28.

An overflow spill 40 is present for regulating the fluid pressure supplied by the pump 15. Said pressure is present in the cylinder space 12. The valve 40 comprises a cylinder in which a sliding valve 41 is axially movable. The sliding valve 41 has a widened part 42 which is loaded at one side by pressure in the space 43, which is equal to the pressure supplied by the pump 15. When the pressure of said pump rises the sliding part 42 will thus move to the left in the situation illustrated. When the sliding valve 41 is moved sufficiently the fluid in the pipe 44 can flow back to the suction side of the pump 15 via the pipe 45.

The sliding valve 41 thus regulates the pressure supplied by the pump 15. Said valve is furthermore influenced, however, by the pressure, dependent on the input speed in the space 46, which is the same as the pressure in the space 22, and furthermore by the compression of the spring 47 which is compressed, via the rod 17 and the lever pivoting about the fulcrum 50, in dependence of the transmission ratio. Thus, by means of the fluid pressure in the space 12, the tension in the belt 14 becomes dependent on the input speed and the transmission ratio.

In the device according to the embodiment illustrated in FIG. 1 the transmission ratio is set in that the control slide 21 connects either the pipes 44 and 6, so that the fluid supplied by the pump 15 can flow to the cylinder space 4 via said pipes, or the pipes 45 and 6, so that fluid from the space 4 can flow out of the cylinder space 4 to the suction side of the pump 15. For moving the pulley half 3 of the primary pulley it is necessary that the effective surface area of the cylinder-piston unit 3, 5 is larger than that of the cylinder-piston unit 10, 11, so that at an equal fluid pressure in both cylinder spaces 4 and 12 the force on the pulley half 3 is greater than that on the pulley half 9. With a constant transmission ratio the control slide 21 will be in a position of equilibrium, whereby the pressure in the pipe 6 is lower than that in the pipe 44. In said position of equilibrium the desired input speed (tension of the spring 27) corresponds with the measured input speed (fluid pressure in the space 22). A change in the transmission ratio results in a displacement of the rod 17 and with it a displacement of a stop 60 of a lever 51 rotatable about a fulcrum 50. The stop 60 co-operates with a surface 61 of the operating means 28 and also, in a corresponding manner, with the surface 62 of the means 28 present at the other side of the stop. The possibilities of movement of the means 28 are thus limited in both directions in dependence of the transmission ratio.

When the cam 31 has rotated so far that one of the surfaces 61 or 62 touches the stop 60 the cam follower 33 will further follow the cam 31, but it will not transmit the cam rotation until the stop 60 moves as a result of a change of the transmission ratio, so that the stop 60 will be released from the relevant surface 61, 62 respectively and the means 28 can move again.

Figure 5:
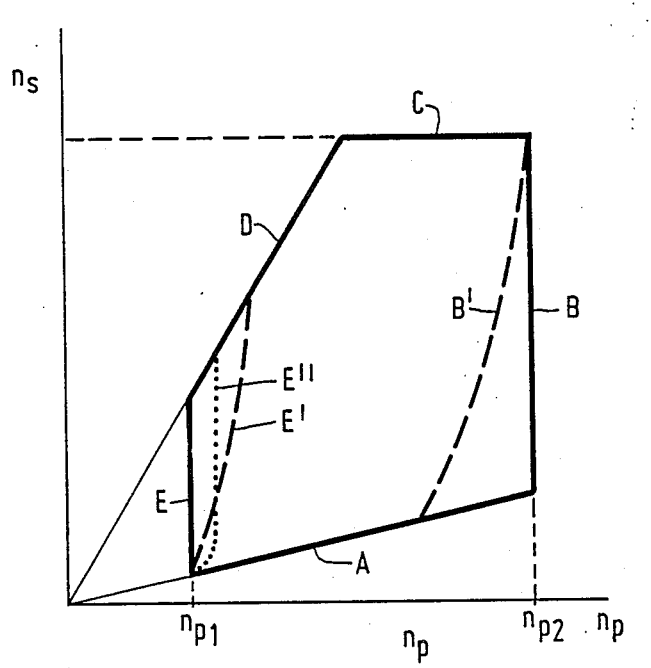
FIG. 5 shows a diagram which illustrates the relation between the speeds of the ingoing and outgoing shafts of the transmission.

FIG. 5 diagrammatically illustrates the effect of the invention. In the diagram the speeds $n_p$ of the primary shaft 1 (the engine speed casu quo the input speed) are plotted in horizontal direction. Said speeds may vary from the set minimum engine speed $n_{p1}$ to the maximum engine speed $n_{p2}$. On the vertical axis the speeds $n_s$ of the secondary axis are plotted. The maximum and the minimum transmission ratios are hereby represented by the lines A and D, whilst the lines B and C represent the maximum engine speeds secondary speeds respectively. The line E represents a permanently set minimum primary speed. In connection with the mass forces which occur on acceleration (the vehicle) and deceleration (the engine) sudden changes are to be avoided and this can be achieved by using the invention, as a result of which the change of the transmission ratio, e.g. according to the dotted lines B' on acceleration, and e.g. according to E' on deceleration will be regulated. This will prevent sudden changes, which are experienced as jerks.

Figure 2:
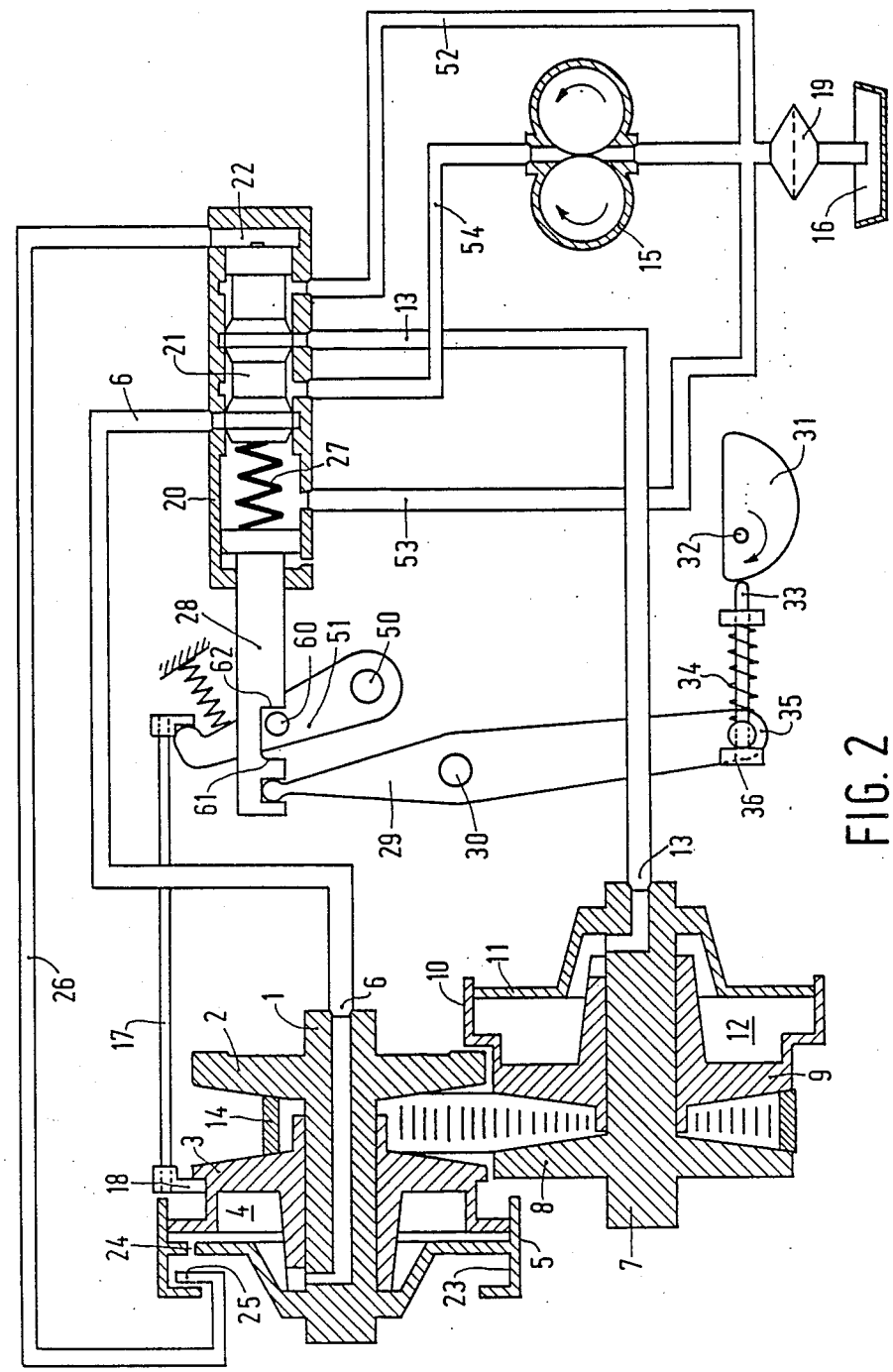
FIG. 2 shows a similar device having only one valve.

In the embodiment according to FIG. 2, just like in the device according to FIG. 1, a displacement of the control slide 21 to the left results in fluid flowing toward the cylinder space 4, so that the transmission changes to a higher gear, (or to a lower transmission ratio), i.e. the peripheral radius on the primary pulley increases and that on the secondary pulley decreases accordingly. A movement of the control slide 21 to the right, on the other hand, correspondingly results in a change to a lower gear. The embodiment according to FIG. 2 will be explained hereinafter.

According to FIG. 2 the fluid supplied by the pump 15 is taken to the valve 20 via the pipe 54. Dependent on the position of the control slide 21 the fluid pressure is subsequently transmitted from the pipe 54, either to the cylinder space 4 via the pipe 6, or to the cylinder space 12 via the pipe 13. In the first case the fluid can flow out of the cylinder space 12 to the pipe 52 via the pipe 13, and in the second case the valve 20 connects the pipes 6 and 53, so that the fluid can flow out of the cylinder space 4 to the low-pressure side of the pump 15. In the stationary condition the control slide 21 will take a position of equilibrium, whereby the measured input speed (oil-pressure in the space 22) corresponds with the desired input speed (the tension of the spring 27 pre-tensioned by rotation of the cam 31).

Because the present invention can be used in the same manner for both embodiments, the explanation given hereinabove also applies to the devices according to the two figures.

Also for the device according to FIG. 2 it applies that the transmission ratio will be regulated e.g. according to the dotted lines B' on accelerating and E' on decelerating.

Figure 3:
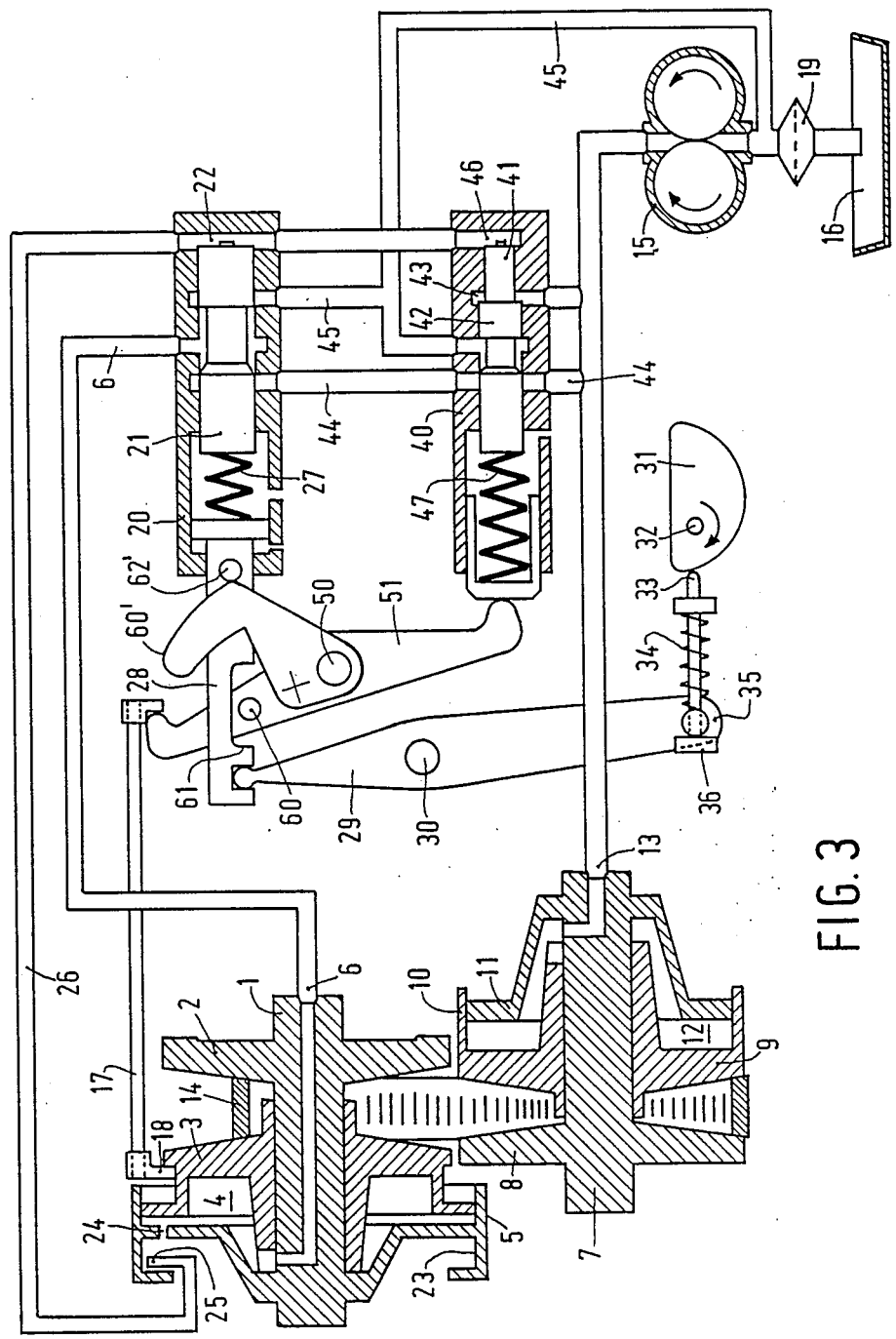
FIG. 3 shows a device, corresponding with FIG. 1, with an improved shape of the stop.

FIG. 3 illustrates a variant of the device according to the invention, which corresponds with the device according to FIG. 1. In FIG. 3, however, the surface 61 cooperates exclusively with the stop 60 for limiting the maximum speed according to the curve B' (FIG. 5). For limiting the minimum speed the device according to the invention is provided with a surface 60', which is shaped as indicated, pivots about the fulcrum 50 and is fixed to the lever 51. The surface 60' co-operates with the cam 62' for limiting the minimum speed according to the curve E" (FIG. 5). The curve E" touches the line A (maximum transmission ratio), as a result of which a smooth change is obtained. Apart from that a small saving in fuel is realized compared to the curve E', because of the practically constant engine speed when the lowest transmission ratio (D) is regulated to about the medium transmission ratio (1:1), and because of the progressive decrease of the engine speed when the transmission ratio is regulated from about the medium to the maximum ratio, as a result of which a substantially lower speed is obtained along the curve E''. It will be apparent that by adapting the shape of the surface 60' various curves for the regulation of the transmission ratio can be obtained, which are advantageous for the various applications of the transmission.

Figure 4:
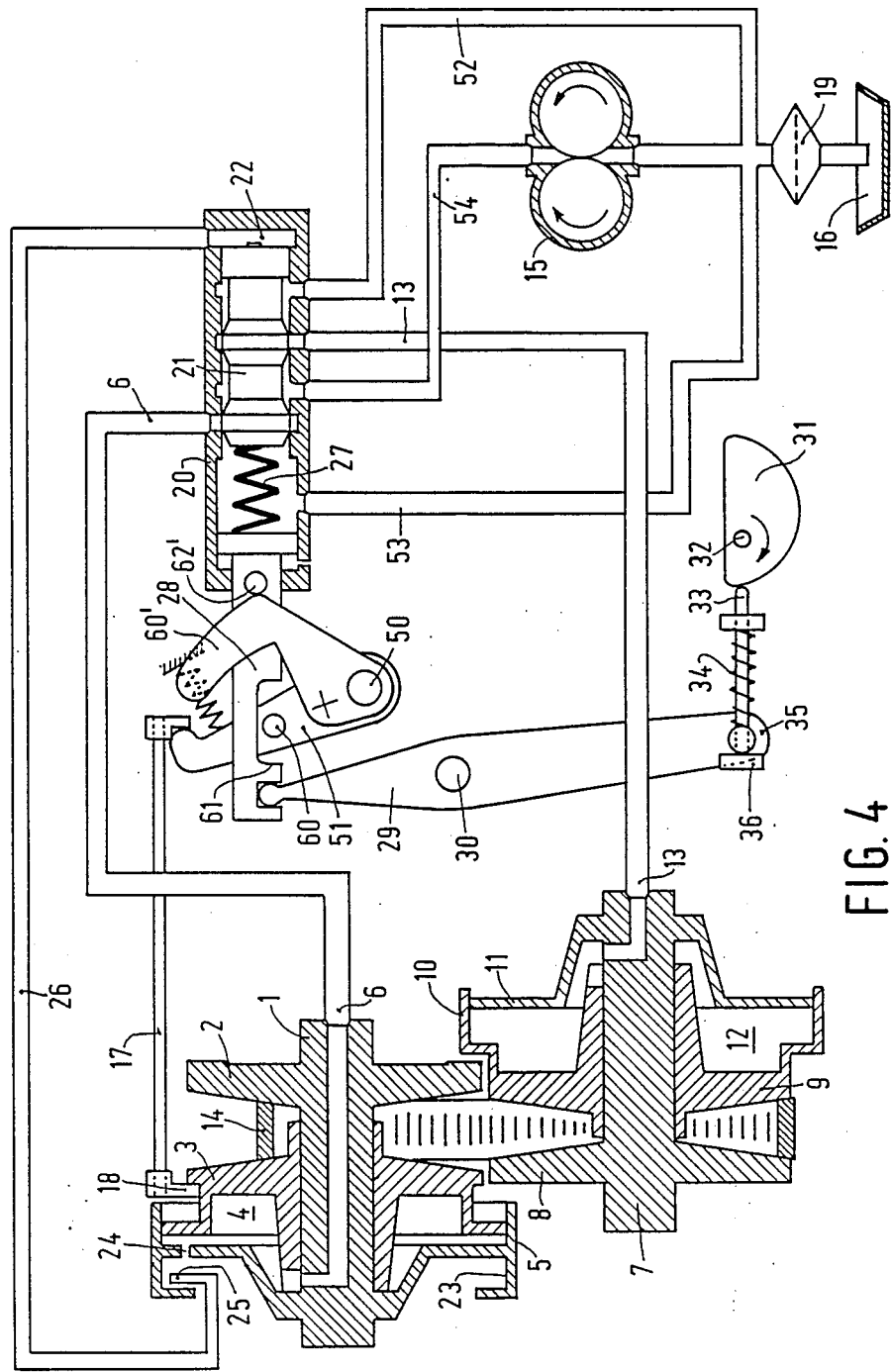
FIG. 4 shows a similar device as FIG. 3 having only one valve.

FIG. 4 illustrates a variant having a single valve, to which the same explanation applies as to FIG. 3. Also for the device according to FIG. 4 the curve E'' according to FIG. 5 applies for the minimum speed.

The embodiments according to the FIGS. 1-4 are only given by way of example, variants will be possible, as will be apparent to persons skilled in the art.

We claim:

1. Control device for controlling the transmission ratio of an infinitely variable transmission including a belt and two pulleys, each pulley having conical discs which are hydraulically movable toward and away from each other, comprising hydraulic means including axially movable slide means for supplying and exhausting hydraulic fluid to the movable pulley discs to effect movement thereof, first means for urging said slide means in a first direction for exhausting hydraulic fluid to the movable pulley discs, second means responsive to the desired engine speed to urge said slide means in an opposite direction to supply hydraulic fluid to the movable pulley discs and third means for limiting the resulting movement of said slide means in said one direction, said third means being responsive to the transmission ratio.

2. Control device according to claim 1, whereby with respect to the desired engine speed the hydraulic control slide means is loaded by a spring which can be compressed under the influence of the engine speed, and with respect to the actual engine speed is influenced by a fluid pressure which is dependent on said engine speed, characterized in that the means to regulate the minimum engine speed in dependence of the transmission ratio comprise a stop member which is displaceable in dependence the transmission ratio.

3. Control device according to claim 2, characterized in that the stop member is shaped such that it allows a lower minimum speed near the maximum transmission ratio and a higher minimum speed near the minimum transmission ratio, and that upon approaching the maximum transmission ratio the minimum speed is regulated such that the transmission ratio changes substantially continuously into the maximum transmission ratio.

4. Control device according to claim 3, characterized in that the means to regulate the minimum engine speed are shaped such that the minimum speed of the minimum transmission ratio remains practically constant to about the 1:1 transmission ratio and then progressively decreases to the maximum transmission ratio.

5. Control device according to claim 2, characterized in that the means to regulate the minimum engine speed are shaped such that the minimum speed of the minimum transmission ratio remains practically constant to about 1:1 transmission ratio and then progressively decreases to the maximum transmission ratio.

6. Control device according to claim 2, characterized in that the means to regulate the minimum engine speed are shaped such that the minimum speed of the minimum transmission ratio remains practically constant to about the 1:1 transmission ratio and then progressively decreases to the maximum transmission ratio.

7. Control device according to claim 1, wherein said second means for urging said slide means in said opposite direction includes an axially displaceable operating member and wherein said third means includes a stop means which limits the maximum axial displacement of said operating member in said one direction, the movement of said stop means being responsive to the transmission ratio.

8. Control device according to claim 7, characterized in that the means to regulate the minimum engine speed are shaped such that the minimum speed of the minimum transmission ratio remains practically constant to about the 1:1 transmission ratio and then progressively decreases to the maximum transmission ratio.

9. Control device according to claim 1 wherein said third means for limiting the resulting movement of said slide means in said one direction, limits said movement as long as said transmission ratio is about 1 or greater than 1.

10. Control device according to claim 9, characterized in that the means to regulate the minimum engine speed are shaped such that the minimum speed of the minimum transmission ratio remains practically constant to about the 1:1 transmission ratio and then progressively decreases to the maximum transmission ratio.

11. Control device according to claim 1, characterized in that the means to regulate the minimum engine speed are shaped such that the minimum speed of the minimum transmission ratio remains practically constant to about the 1:1 transmission ratio and then progressively decreases to the maximum transmission ratio.

* * * * *